APPARATUS FOR SUPPORTING A CAPSTAN OF A TAPE RECORDER
Filed May 19, 1967
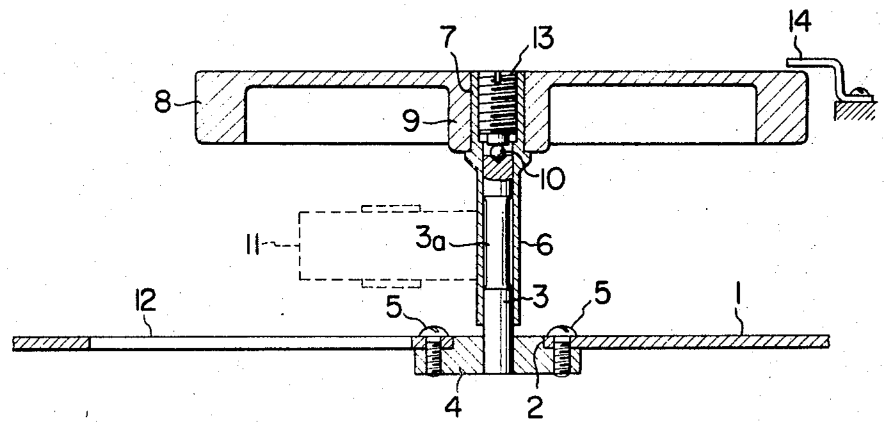
INVENTOR
YOSHIYUKI WATANABE
BY
H. Edward Masters United States Patent Office 3,439,558
Patented Apr. 22, 1969

3,439,558

APPARATUS FOR SUPPORTING A CAPSTAN OF A TAPE RECORDER

Yoshiyuki Watanabe, Tokyo-to, Japan, assignor to Kabushiki Kaisha Sankei Seisakusho, Tokyo-to, Japan, a joint-stock company of Japan Filed May 19, 1967, Ser. No. 639,748
Claims priority, application Japan, July 1, 1966, 41/62,581
Int. Cl. G11b *15/28, 15/29*
U.S. Cl. 74—573 1 Claim

ABSTRACT OF THE DISCLOSURE

A tubular capstan carrying a fly-wheel is slipped over a vertical stationary supporting shaft and a pinch roller is selectively brought against an intermediate portion of the tubular capstan. The diameter of the portion of the supporting shaft corresponding to said intermediate portion is reduced to form bush bearings above and below the intermediate portion and the weight of the capstan and fly ball is supported by the supporting shaft through an adjustable screw driven in the upper portion of the capstan and a thrust ball.

This invention relates to apparatus for supporting a capstan of a tape recorder.

In the drive of a capstan of a tape recorder it is usual to couple a combined fly-wheel and driven wheel to the capstan in order to render uniform the rotatory speed thereof. However, when the driven wheel is positioned below the capstan, in order to prevent transversal vibration of the capstan which is caused by the driving power applied thereto from one side thereof and hence to rotate smoothly the capstan about its normal vertical axis it is necessary to provide strong bearings on both side of the combined fly-wheel and driven wheel. But such construction is disadvantageous in that the height of the drive is increased.

It is therefore an object of the invention to eliminate such defects.

Further object of this invention is to provide a novel apparatus for supporting a capstan of a tape recorder wherein the physical dimensions and weight of the bearing means for the capstan can be reduced and transversal vibration of the capstan can be effectively prevented.

According to a preferred embodiment of this invention, a tubular capstan is slipped over a vertical stationary supporting shaft, and a pinch roller is selectively urged against an intermediate portion of the tubular capstan, the diameter of the portion of the supporting shaft corresponding to said intermediate portion being reduced to form bush bearings above and below said intermediate portion. A fly-wheel is mounted on the upper portion of the capstan. An adjustable screw is driven in said upper portion of the tubular capstan and a thrust ball is interposed between the lower end of the screw and the upper end of the supporting shaft whereby to support the weight of the capstan and fly-wheel by the supporting shaft. The screw is adjusted to equalize the axial length of upper and lower bush bearings.

This invention can be more fully understood from the following description taken in connection with the accompanying drawing in which a single drawing shows a vertical sectional view of an apparatus for supporting a capstan embodying this invention.

Referring now to the accompanying drawing a horizontal wall 1 of a casing (not shown) of a tape recorder is provided with an opening 2 and a circular disc shaped supporting base 4 is inserted from under into the opening 2 and secured to the wall 1 by means of screws 5. The lower end of a vertical supporting shaft 3 is secured to the supporting disc by force fit. A generally tubular capstan 6 including a upper portion 7 which supports a hub 9 of a fly-wheel 8 is fitted over the supporting shaft to journal the fly-wheel on the shaft 3. A screw 13 is driven in the shaft portion 7 and the entire weight of the capstan 6 and the fly-wheel 8 is supported by the supporting shaft 3 through a thrust ball 10 interposed between shaft 3 and screw 13. A pinch roller 11 is brought to a position indicated by phantom lines to urge against an intermediate portion of the tubular capstan 6 by manipulating it through an opening 12 of the horizontal wall 1, when desired. As shown in the drawing, the diameter of the portion 3*a* of the shaft 3 opposing the pinch roller 11 is reduced to define an annular space between the reduced portion 3*a* of the shaft 3 and the capstan 6 and to form two spaced bearing portions above and below said portion 3*a*, the annular space being utilized as a reservoir for a lubricant. The contact area or bearing surface between the shaft 3 and the capstan 6 is adjustable by adjusting screw 13. In order to prevent excessive floating up of fly-wheel 8 a suitable stationary stop 14 may be provided in the casing, said stop being normally spaced from the upper surface of the fly-wheel.

With the construction described above the bearing means for the capstan and fly-wheel is greatly miniaturized so that not only the weight and space occupied by the device can be reduced but also transversal vibration thereof can be effectively prevented. Moreover as the portions of the capstan above and below the portion thereof engaging the pinch roller are positively journalled by the upper and lower portions of the shaft 3, which may be of equal length, it is able to rotate the capstan assembly very smoothly.

While the invention has been shown and described in connection with a preferred embodiment thereof, the invention is not limited thereto and includes any modifications and alterations as fall within the true spirit and scope of this invention.

What is claimed is:

1. An apparatus for supporting a capstan of a tape recorder comprising a vertical stationary supporting shaft, a tubular capstan slipped over said shaft to be rotatable thereabout, a pinch roller operable to be urged against an intermediate portion of said tubular capstan, the diameter of the intermediate portion of said supporting shaft being reduced as compared to the portions above and below, whereby said tubular capstan is journalled at said portions of said supporting shaft above and below said reduced diameter portion, a flywheel mounted on the upper portion of said capstan, said flywheel having a threaded opening coaxial with said supporting shaft, an adjustable screw threaded in said threaded opening and a thrust ball disposed between the inner end of said screw and the upper end of said supporting shaft.

References Cited

UNITED STATES PATENTS

| | | | |
|---|---|---|---|
| 1,896,466 | 2/1933 | Schaum | 74—573 |
| 705,839 | 7/1902 | Henderson | 308—166 |
| 2,492,066 | 12/1949 | Schildmeier | 74—573 |
| 3,122,294 | 2/1964 | Laa | 226—188 |

FRED C. MATTERN, Jr., *Primary Examiner.*

W. S. RATLIFF, Jr., *Assistant Examiner.*

U.S. Cl. X.R.

274—4.